United States Patent [19]
Tanaka et al.

[11] Patent Number: 5,761,545
[45] Date of Patent: Jun. 2, 1998

[54] PAN SHOT DEVICE FOR A CAMERA

[75] Inventors: Etsuo Tanaka, Tokyo; Akira Katayama, Koganei, both of Japan

[73] Assignee: Nikon Corporation, Tokyo, Japan

[21] Appl. No.: 917,751

[22] Filed: Aug. 27, 1997

Related U.S. Application Data

[63] Continuation of Ser. No. 745,227, Nov. 8, 1996, abandoned, which is a continuation of Ser. No. 232,397, Apr. 25, 1994, abandoned, which is a continuation of Ser. No. 12,386, Feb. 2, 1993, abandoned.

[30] Foreign Application Priority Data

Feb. 6, 1992 [JP] Japan ................... 4-056219
Feb. 24, 1992 [JP] Japan ................... 4-072120

[51] Int. Cl.⁶ .................................. G03B 17/00
[52] U.S. Cl. .................... 396/53; 396/52; 396/55
[58] Field of Search .................... 396/52, 53, 54, 396/55

[56] References Cited

U.S. PATENT DOCUMENTS

| | | | |
|---|---|---|---|
| 4,780,739 | 10/1988 | Kawakami et al. | 354/430 |
| 4,970,540 | 11/1990 | Vasey et al. | 354/202 |
| 5,012,270 | 4/1991 | Sekine et al. | 354/430 |
| 5,107,293 | 4/1992 | Sekine et al. | 354/430 |
| 5,117,246 | 5/1992 | Takahashi et al. | 354/202 |
| 5,231,445 | 7/1993 | Onuki et al. | 354/410 |

FOREIGN PATENT DOCUMENTS

| | | |
|---|---|---|
| 0 200 442 | 11/1986 | European Pat. Off. . |
| 0 435 319 | 7/1991 | European Pat. Off. . |
| 1-193721 | 8/1989 | Japan . |
| 2-154214 | 6/1990 | Japan . |
| 4-34525 | 2/1992 | Japan . |

OTHER PUBLICATIONS

Patent Abstracts of Japan, vol. 16, No. 205 (P-1353), May 15, 1992.
Patent Abstracts of Japan, vol. 14, No. 309 (P-1071), Jul. 4, 1990.

*Primary Examiner*—Russell E. Adams

[57] ABSTRACT

In a device, an angular velocity detector detects the angular velocity of a camera body and produces a signal conforming thereto. Whether the camera is performing pan shot is discriminated on the basis of the produced signal. Preferably, the discrimination is effected on the basis of a signal from which the high frequency component of the signal has been eliminated. Also, in one mode, the device sets an appropriate shutter speed when it is detected that the mode is pan shot.

11 Claims, 11 Drawing Sheets

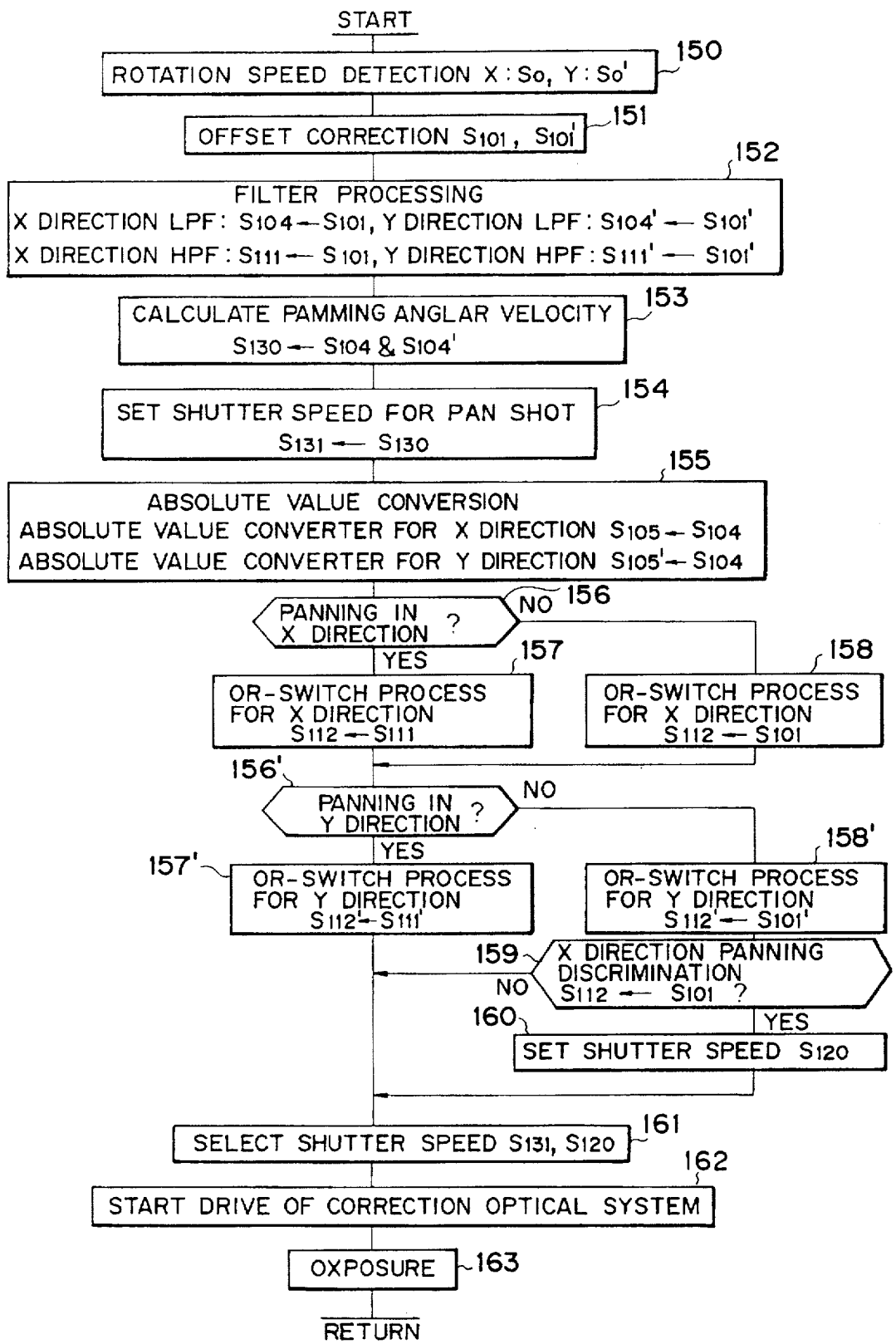

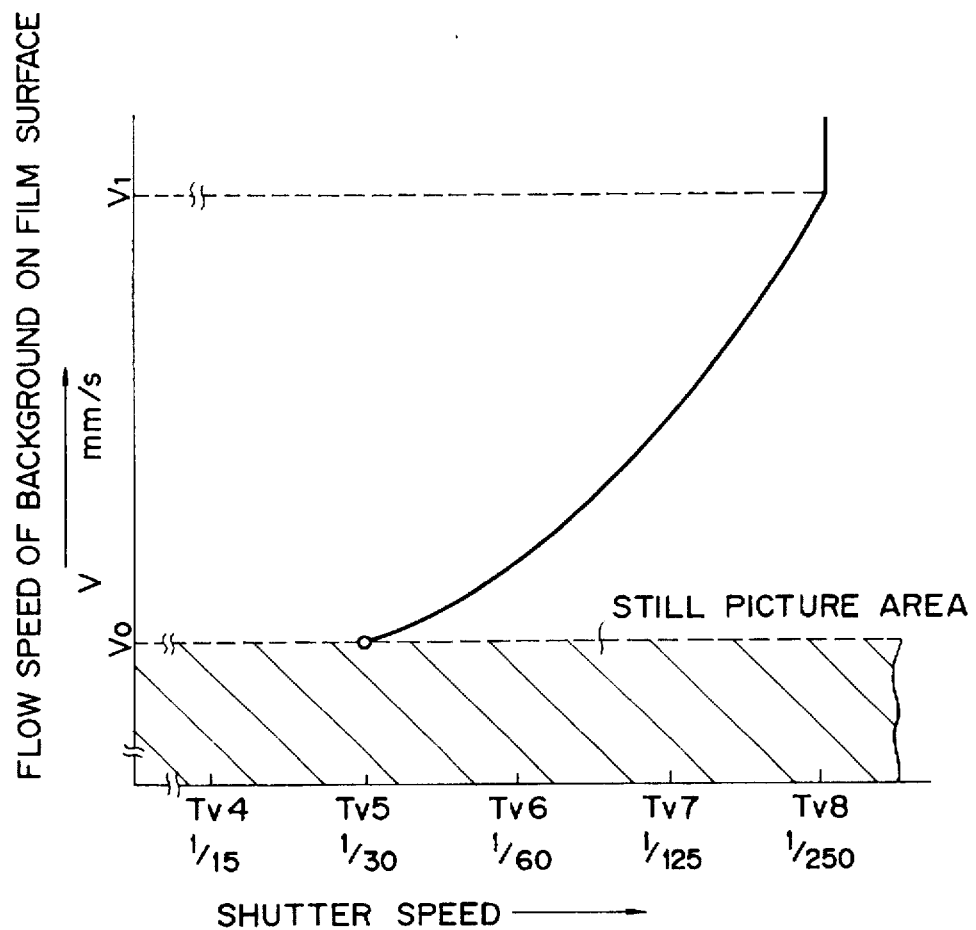

PAN SHOT DEVICE FOR A CAMERA

This application is a continuation of application Ser. No. 08/745,227, filed Nov. 8, 1996, now abandoned, which in turn was a continuation application for application Ser. No. 08/232,397, filed Apr. 25, 1994, now abandoned, which application in turn was a continuation application of application Ser. No. 08/012,386, filed Feb. 2, 1993, now abandoned.

BACKGROUND OF THE INVENTION

1. Field of the Invention

This invention relates to a pan shot device particularly suitable for use in a camera having a camera shake preventing function.

2. Related Background Art

Heretofore, it has sometimes been the case with a camera shake preventing camera that when a moving object is pursued by the camera in an attempt to effect pan shot, the camera judges it as a camera shake and a correction optical system operates and therefore the resultant photograph is a photograph in which the background is stationary and a main object is blurred.

In the camera of Japanese Laid-Open Patent Application No. 2-154214, when the pan shot mode is selected, the movement speed of a main object is input to the camera in advance and the photographer waits with the camera remaining fixed. When the main object appears in the image field, a correction optical system is operated with the camera remaining stationary, and in accordance with the movement speed input in advance, a shake correction lens pursues the main object, whereby pan shot can be effected.

In the prior-art camera described above, however, the photographer must select a mode as to whether pan shot should be effected, or must input the movement speed of the main object each time, and this has led to the problem that pan shot cannot be immediately effected.

Also pan shot is effected by the correction optical system being operated with the camera fixed, and this has led to the problem that when the speed of the main object is high and the shutter speed is low, the correction optical system strikes against the end of its operation range while the shutter is open and thus, pan shot becomes impossible.

It is usual to make the shutter speed during pan shot lower than in the case of ordinary photographing in order to represent the feeling of lively motion of a main object, and the degree thereof is various depending on the movement speed of the main object. However, there has been the problem that in the prior-art device, the photographer's long experience is resorted to determine the relation between the speed of the main object and the shutter speed during pan shot and it is difficult for an unskilled photographer to achieve an effect as be desires.

SUMMARY OF THE INVENTION

It is an object of the present invention to solve the above-noted problems and to provide a pan shot device capable of automatically judging that a pan shot mode has been selected, and effecting pan shot without any prearranged preparation.

It is another object of the present invention to provide a camera by which even an unskilled photographer can effect effective pan shot.

The pan shot device according to the present invention has an angular velocity sensor for detecting the angular velocity of a camera body, and pan shot discriminating means for discriminating from the angular velocity detected by said angular velocity sensor whether the mode is pan shot.

Also, the pan shot device according to the present invention can be applied to a camera shake preventing camera having shake detecting means for detecting a camera shake and outputting a shake detection signal, a correction optical system for correcting said camera shake, and a correction optical system driving portion for driving said correction optical system on the basis of the shake detection signal from said shake detecting means. This device includes pan shot discriminating means for discriminating whether the mode is pan shot, on the basis of a signal from which the high frequency component of the shake detection signal from said shake detecting means has been eliminated.

Further, the pan shot device for a camera shake preventing camera according to the present invention having shake detecting means for detecting a camera shake and outputting a shake detection signal a correction optical system for correcting said camera shake, and a correction optical system driving portion for driving said correction optical system on the basis of the shake detection signal from said shake detecting means may comprise pan shot discriminating means for eliminating the high frequency component of the shake detection signal from said shake detecting means to thereby discriminate whether the mode is pan shot, and switching means for intercepting the shake detection signal to said correction optical system driving portion when it is discriminated by said pan shot discriminating means that the mode is pan shot.

Furthermore, the pan shot device for a camera shake preventing camera having shake detecting means for detecting a camera shake and outputting a shake detection signal, a correction optical system for correcting said camera shake, and a correction optical system driving portion for driving said correction optical system on the basis of the shake detection signal from said shake detecting means may comprise pan shot discriminating means for eliminating the high frequency component of the shake detection signal from said shake detecting means to thereby discriminate whether the mode is pan shot, shake component extracting means for eliminating the low frequency component of the shake detection signal from said shake detecting means to thereby extract a shake component, and switching means for connecting the shake component extracted by said shake component extracting means to said correction optical system driving portion.

According to the present invention, whether the mode is pan shot can be discriminated by the pan shot discriminating means and therefore, it is not necessary to manually select the pan shot mode or input the movement speed and distance data of an object in advance as in the prior art.

Also, where the pan shot device according to the present invention is applied to a shake preventing camera, when the photographer shakes the camera and begins pan shot, the pan shot discriminating means discriminates on the basis of the shake detection signal from the shake detecting means whether the mode is pan shot.

The discrimination of whether the mode is pan shot is accomplished by eliminating the high frequency component of the shake detection signal by low-pass filter means or the like provided in a shake detection signal transmitting system to thereby measure that the camera is moving in one direction at a low speed.

When the pan shot discriminating means discriminates that the mode is pan shot, camera shake preventing control in the direction (horizontal or vertical) in which the camera is being shaken is changed by the switching means to thereby release the camera shake preventing control in the pan shot direction or effect the camera shake preventing control by only the high frequency component.

If this is done, pan shot can be simply effected by the use of shake preventing camera.

Also, according to the present invention, pan shot is effected by moving the camera and therefore, it never happens that as in the prior art, the correction optical system strikes against the end of its operation range and pan shot becomes impossible.

A pan shot device according to another embodiment of the present invention has the function of setting a shutter speed suitable for pan shot. This device is provided with a sensor for detecting the angular velocity of a camera about an axis parallel to the image field, and pan shot shutter speed setting means for setting a shutter speed on the basis of an angular velocity signal produced from the sensor and the focal length of a lens. This device is provided with pan shot shutter speed setting means for setting a shutter speed optimum during pan shot as well on the basis of the angular velocity signal produced from the sensor for detecting the angular velocity of the camera about the axis parallel to the image field and the focal length of the lens and therefore, optimum pan shot can be accomplished by a shutter time determined by the setting means. This device is suitable, for example, for a camera having a lens of single focal length mounted thereon.

A second embodiment of the present invention is provided with a sensor for detecting the angular velocity about an axis parallel to the image field, focal length signal transmitting means for transmitting the focal length of a photo-taking lens to a camera body, background flow speed calculating means for calculating the background flow speed on the image field from the angular velocity signal of the sensor and the focal length of the photo-taking lens, pan shot shutter speed setting means for setting a shutter speed from the background flow speed, and pan shot discriminating means for discriminating from the background flow speed whether the camera is in a pan shot state. In this device, the background flow speed on the image field is calculated by the background flow speed calculating means from the angular velocity signal produced from the sensor for detecting the angular velocity about the axis parallel to the image field and the focal length of the photo-taking lens transmitted to the camera body by the focal length signal transmitting means, and the shutter speed is set from the background flow speed by the pan shot shutter speed setting means. Preferably, this device is provided with shutter speed selecting means for operating a shutter at the shutter speed set by the pan shot shutter speed setting means when the mode is discriminated as pan shot.

In the above-described above, the sensor can detect the angular velocity about both of a first axis parallel to the image field and a second axis also parallel to the image field and perpendicular to the first axis.

BRIEF DESCRIPTION OF THE DRAWINGS

FIG. 7 is a flow chart illustrating the operation of the pan shot device according to the third embodiment of the present invention.

FIG. 10 is a graph showing the relation between the flow speed of the background and the shutter speed in pan shot shutter speed setting means.

DETAILED DESCRIPTION OF THE PREFERRED EMBODIMENTS

The present invention will hereinafter be described in greater detail with respect to some embodiments thereof with reference to the drawings.

Figure 1:
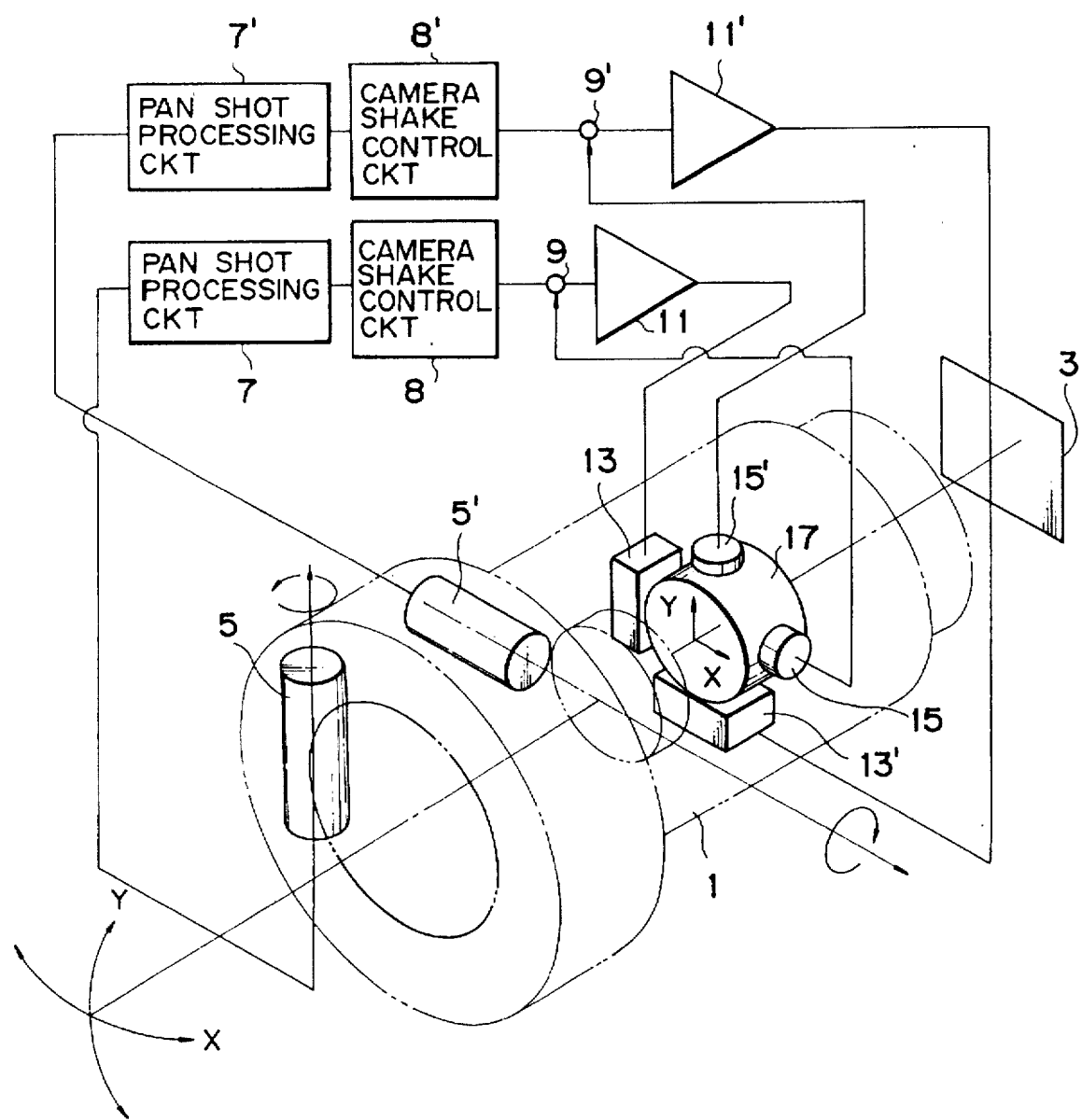
FIG. 1 shows the construction of a first embodiment of a pan shot device according to the present invention.

FIG. 1 shows the construction of a first embodiment of a pan shot device according to the present invention.

In FIG. 1, the reference numeral 1 designates a lens barrel, the reference numeral 3 denotes an image field, the reference numeral 5 designates an angular velocity sensor for X direction, and the reference numeral 5' denotes an angular velocity sensor for Y direction.

In the ensuing description, it is to be understood that reference numerals without prime designate parts associated with a pan shot device for X direction and reference numerals with a prime denote parts associated with a pan shot device for Y direction. Also, where X direction and Y direction are common to each other, only the parts for X direction will be described and unless particularly necessary, the parts for Y direction will not be descried.

The angular velocity sensor 5 is a sensor for detecting a camera shake, and the outputs thereof is connected to a pan shot processing circuit 7. The pan shot processing circuit 7 is a circuit for effecting the pan shot processing which will be described later on the basis of the output of the angular velocity sensor 5, and the output thereof is connected to a camera shake control circuit 8.

The camera shake control circuit 8 is a circuit for determining the direction and amount of movement of a correction optical system 17 on the basis of the angular velocity detected by the angular velocity sensor 5.

The output of the camera a shake control circuit 8 is connected to a driving amplifier 11 through the meeting point 9 of feedback controls.

The driving amplifier 11 is an amplifier for driving the camera shake correction optical system 17 on the basis of a camera shake control signal, and the output thereof is connected to an actuator 13.

The actuator 13 is for moving the camera shake correction optical system 17 in X direction, and may be a motor or the like.

A position detector 15 is a detector for detecting the movement of the camera shake correction optical system 17 to thereby effect feedback control, and may be an encoder or the like.

Figure 2:
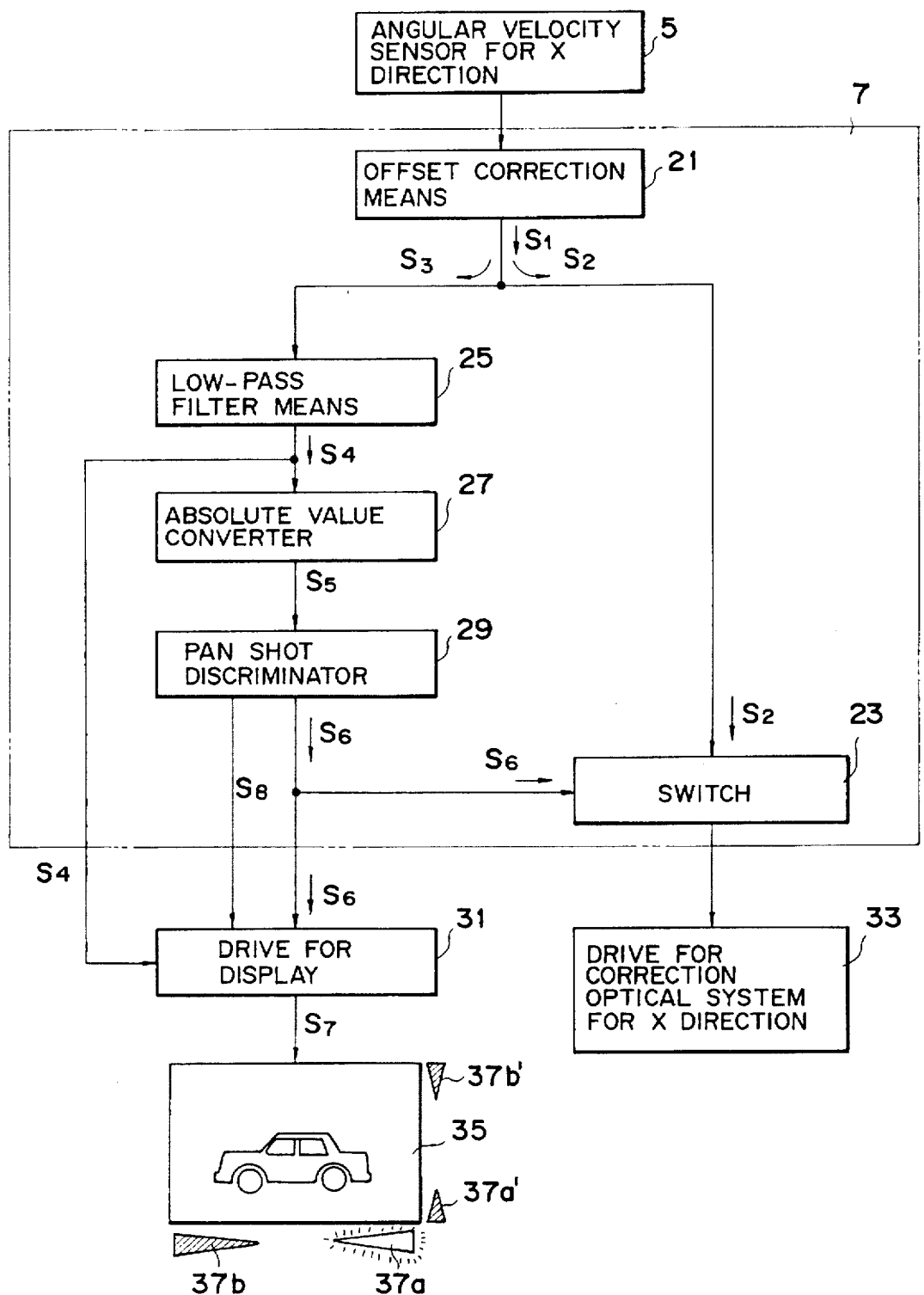
FIG. 2 is a block diagram showing the pan shot processing circuit (X direction) of the pan shot device according to the first embodiment.

The camera shake control circuit 8, the meeting point 9, the driving amplifier 11, the actuator 13, the position detector 15 and the camera shake correction optical system 17 together are called a correction optical system driving portion 33 shown in FIG. 2.

Figure 3:
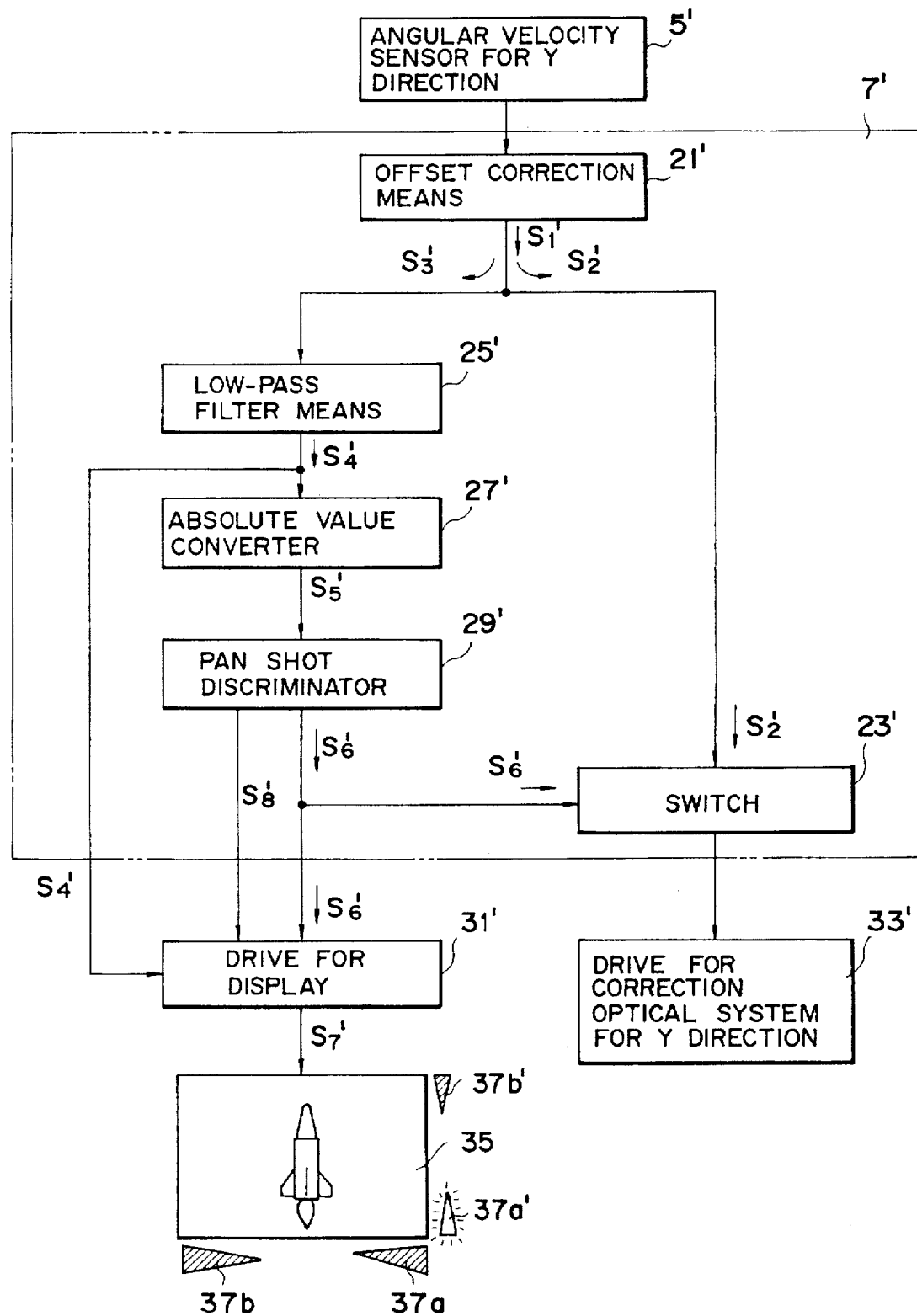
FIG. 3 is a block diagram showing the pan shot processing circuit (Y direction) of the pan shot device according to the first embodiment.
Figure 4A:
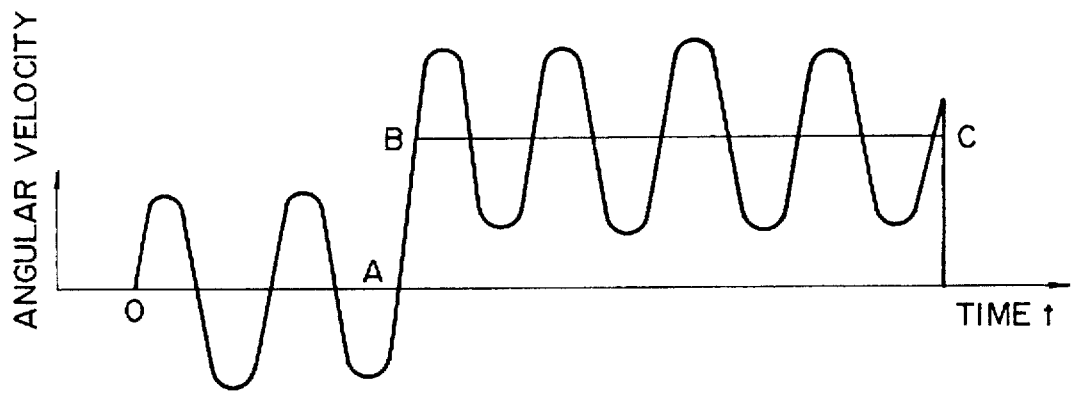
FIGS. 4A-4C are waveform graphs for illustrating the operation of the pan shot device according to the first embodiment.
Figure 4B:
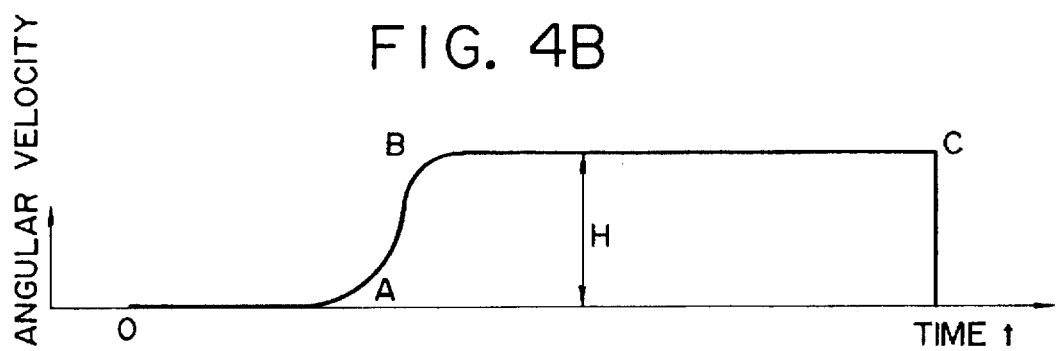
Figure 4C:
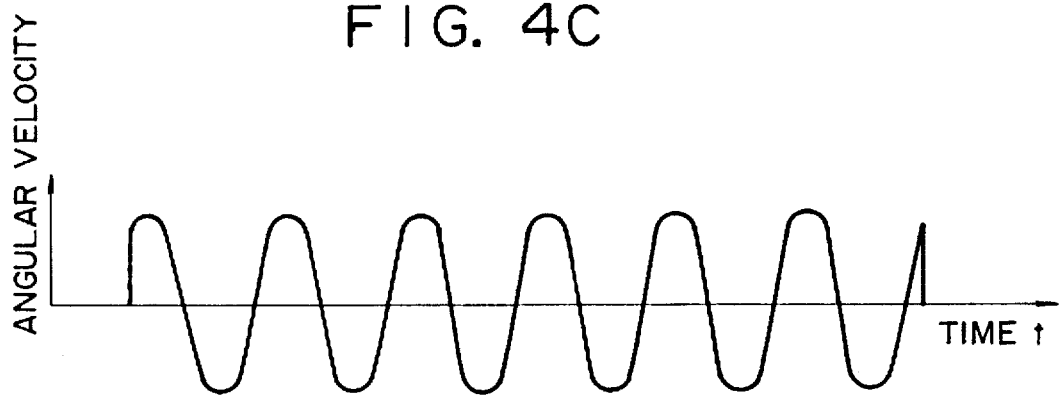

FIG. 2 is a block diagram showing a pan shot processing circuit for X direction in the pan shot device according to the first embodiment, FIG. 3 is a block diagram showing a pan shot processing circuit for Y direction, and FIGS. 4A–4C are waveform graphs for illustrating the operation of the first embodiment.

The output of the angular velocity sensor 5 is connected to offset correction means 21. The output of the angular velocity sensor 5 usually has offset applied thereto and therefore, it is converted into a vibration waveform centering around zero through the offset correction means 21.

The offset correction means acts as a subtractor when positive offset is applied to the output of the angular velocity sensor 5, and acts as an adder when negative offset is applied to the output of the angular velocity sensor 5.

Usually, the vibration of a camera shake is of a complicate shape in which waveforms of 10 and several Hz to the order of 1 Hz are superposed one upon another, but herein, for simplicity, consideration will be made with the vibration of a camera shake substituted for by a sin curve.

The waveform of FIG. 4A shows a signal $S_1$ output from the offset correction means 21. The signal $S_1$ from the offset correction means 21 branches off in two directions, and one signal $S_2$ is connected to a switch portion 23 which will be described later, and the other signal $S_3$ is connected to low-pass filter means 25.

Here, consider a case where the photographer pans an automobile from the right to the left of the image field.

The waveform of the camera shake shown in FIG. 4A catches the automobile at a point A, and begins to pursue after the automobile at a point B, whereat pan shot is entered. Since the camera is pursuing after the automobile, the waveform rises from the axis of zero after the point B and moves at a substantially constant angular velocity. At a point C, the shutter is closed and the pan shot is terminated.

At this time, the low-pass filter means 25 cuts the high frequency component of a signal $S_3$ from the offset correction means 21 and outputs a signal $S_4$ of a rising waveform as shown in FIG. 4B. The height H of the rise corresponds to the angular velocity at which the camera is shaken.

FIG. 4B shows a point of time 0 at which a shutter button is half-depressed to make the camera ready for photographing, a point of time A at which the camera catches the automobile, a point of time B at which the camera begins to pursue after the automobile, and a point of time C at which the shutter button is released and exposure onto the image field is terminated.

The output $S_4$ of the low-pass filter means 25 is connected to an absolute value converter 27. The absolute value converter 27 is a converter which outputs only the absolute value of a voltage, irrespective of the positive or negative sign of the voltage.

In contrast to the above-described embodiment, the camera is shake from left to right and pan shot is effected, the output $S_4$ of the low-pass filter means 25 is put out as a reverse voltage and falls from after the point A and therefore, the absolute value converter 27 is provided to prevent the angular velocity at which the camera is shaken from becoming unable to be detected depending on the height H of the rise. That is, by providing the absolute value converter 27, the angular velocity of pan shot becomes detectable with the aid of the height H of the rise of the waveform as shown in FIG. 4B, independently of the direction in which the camera is shaken.

The absolute value converter 27 need not be provided depending on the construction of a pan shot discriminator 29 which will be described later.

The output $S_5$ of the absolute value converter 27 is connected to the pan shot discriminator 29. The pan shot discriminator 29 is for finding the flow speed of the background on the image field by the product of the height H of the rise of FIG. 4B, i.e. the angular velocity of the camera, and the focal length of the lens, and discriminating whether the photographer is performing pan shot.

The pan shot discriminator 29 discriminates that the mode is not pan shot when for example, the absolute value of the flow speed is the background on the image field is of the order of 0.05 mm per second, or that pan shot is going on when the absolute value of the flow speed of the background on the image field is of the order of 0.5 mm per second.

When the pan shot discriminator 29 discriminates that pan shot is going on, it produces a pan shot discrimination signal $S_6$. In this manner, pan shot discriminating means is constituted by at least the low-pass filter means 25 and the pan shot discriminator 29.

In the case of a fixed focus camera which is not of the lens interchange type, the flow speed of the background on the image field is determined by only the angular velocity at which the camera is shaken and therefore, the discrimination of pan shot can be effected by only the angular velocity of the camera.

That is, the pan shot discriminator 29 discriminates that when the height H of the rise of FIG. 4B is of the order of 1 degree per second, the mode is not pan shot, or that when the height H of the rise is of the order of 30 degrees per second, pan shot is going on.

Although not shown, when in a camera of the lens interchange type, whether pan shot is being effected is to be discriminated from the flow speed of the background on the image field, provision is made of focal length signal means for transmitting the focal length of the lens to the camera.

The pan shot discrimination signal $S_6$ output from the pan shot discriminator 29 is connected to the switch portion 23 and a drive 31 for display. In the case of ordinary photographing in which the pan shot discrimination signal $S_6$ is not produced, the switch portion 23 is closed and the signal $S_2$ passed from the angular velocity sensor 5 through the offset correction means 21 passes through the switch portion 23 and is transmitted to a drive 33 for correction optical system for X direction to thereby correct a camera shake in X direction.

On the other hand, when the pan shot discriminator 29 produces the pan shot discrimination signal $S_6$, the switch portion 23 becomes OFF in response to the signal $S_6$ and does not transmit the signal $S_2$ from the offset correction means 21 to the drive 33 for correction optical system for X direction. Therefore, the correction optical system 17 remains at the neutral point in X direction and comes to move only in Y direction and thus, the correction of a camera shake in X direction is not effected. Accordingly, the photographer can freely pan the automobile running in X direction (horizontal direction).

In this case, in Y direction (vertical direction), a drive 33' for correction optical system for Y direction shown in FIG. 3 is operating for the correction of a camera shake and therefore, the resultant photograph is not blurred in Y direction.

On the other hand, the pan shot discrimination signal $S_6$ produced from the pan shot discriminator 29 branches off and is connected to the drive 31 for display. The drive 31 for display starts driving by this pan shot discrimination signal $S_6$.

When it starts driving, the drive 31 for display receives the signal $S_4$ from the low-pass filter means 25. From this signal $S_4$, the direction of pan shot and the angular velocity thereof are input. Also, a signal $S_8$ produced from the pan shot discriminator 29 is a signal which transmits the flow speed of the background on the image field.

The drive 31 for display outputs a display signal $S_7$ from these signals $S_4$ and $S_8$. This display signal $S_7$ turns on or turns on and off the direction of pan shot and the flow speed of the background on the image field around a finder 35, on in the case of a camera which is not of the lens interchange type, a wedge-shaped display 37 (in the case of FIG. 2, 37a) indicative of the angular velocity of the camera around the finder 35.

This wedge-shaped display 37 is indicative of the magnitude of the flow speed of the background on the image field by the length of its wedge, and is indicative of the direction of pan shot by the direction of its wedge. In the case of a camera which is not of the lens interchange type, the length of the wedge is indicative of the magnitude of the angular velocity.

When the signal $S_6$ from the pan shot discriminator 29 is not input to the drive 31 for display, the drive 31 for display does not operate and does not receive the signal $S_4$. Accordingly, the display signal $S_7$ is not produced and the display 37 is not effected.

The above-described operation of the camera is performed from after the photographer half-depresses the shutter button to make the camera ready for photographing until the shutter completes the exposure onto the image field.

FIG. 3 is a block diagram of the first embodiment shown in FIG. 2 for Y direction, and the contents thereof are entirely similar to those of FIG. 2 and need not be described.

As described above, in the first embodiment, when the camera automatically judges pan shot, the correction of the camera shake in that direction is released and therefore, the photographer can freely perform pan shot.

Figure 5:
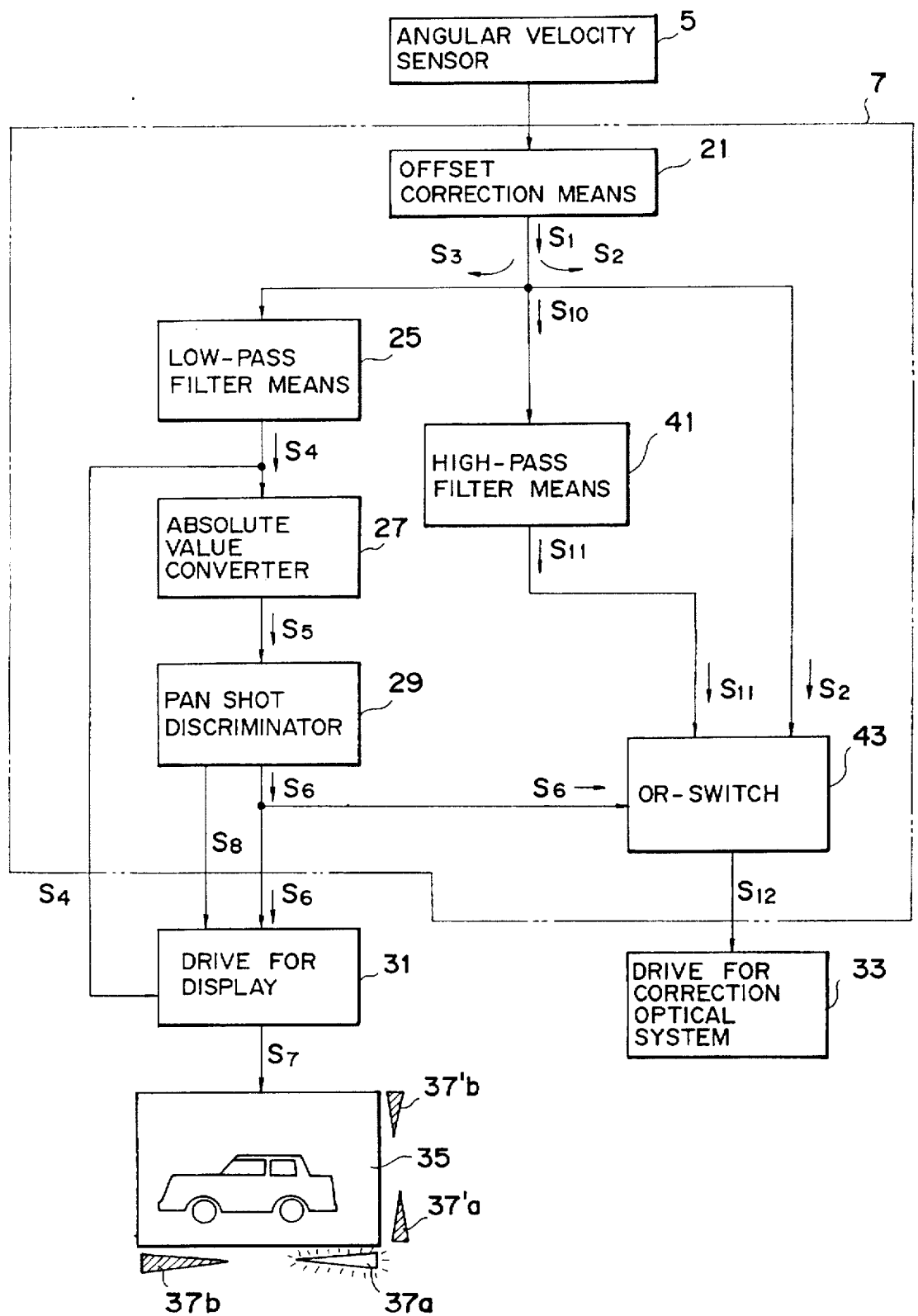
FIG. 5 is a block diagram showing a pan shot processing circuit in a second embodiment of the pan shot device according to the present invention.

FIG. 5 is a block diagram showing a pan shot processing circuit for X direction in a second embodiment of the pan shot device according to the present invention.

In FIG. 5, parts functionally similar to those in the aforedescribed first embodiment are given similar reference numerals, and FIGS. 1 and 4A to 4C will be intactly used for description, and parts common to the first embodiment need not be described.

A camera shake detection signal (angular velocity) detected by the angular velocity sensor 5 is input to offset correction means 21. The output $S_1$ of the offset correction means 21 has a waveform as shown in FIG. 4A. This signal $S_1$ branches off into signals $S_2$, $S_{10}$ and $S_3$ in three directions.

Of these signals, the signal $S_3$ is transmitted to the pan shot discriminator 29 by a route similar to that in the first embodiment, and when the pan shot discriminator 29 discriminates that the photographer is performing pan shot, a pan shot discrimination signal $S_6$ is produced, and when the pan shot discriminator 29 discriminates that the photographer is not performing pan shot, the pan shot discrimination signal $S_6$ is riot produced.

The pan shot discrimination signal $S_6$ and the signal $S_2$ are input to an OR-switch portion 43 which will be described later.

On the other hand, the signal $S_{10}$ is input to high-pass filter means 41, which cuts the low frequency component of the angular velocity of a camera shake and outputs the high frequency component thereof as a signal $S_{11}$.

FIG. 4C shows the signal $S_{11}$. In this signal $S_{11}$, a rising portion created during pan shot is cut and only a high frequency component is left. This high frequency component corresponds to the irregularity of the pursuit of a main object occurring during pan shot.

This irregularity does not appear in the resultant photograph when during pan shot, the photographer photographs at a relatively high shutter speed, yet appears as the blur of the main object when the photographer uses a low shutter speed to fully achieve the effect of pan shot.

The output $S_{11}$ of the high-pass filter means 41 is connected to the OR-switch portion 43. This OR-switch portion 43 receives only the output signal $S_{11}$ of the high-pass filter means 41 when the pan shot discrimination signal $S_6$ is produced, and outputs a signal $S_{12}$ of the same waveform as the signal $S_{11}$. Also, the OR-switch portion 43 receives only the signal $S_2$ when the pan shot discrimination signal $S_6$ is not produced, and outputs a signal $S_{12}$ of the same waveform as the signal $S_2$.

Accordingly, during pan shot in which the pan shot discrimination signal $S_6$ is produced, the shake of the high frequency component which is the output of the high-pass filter means 41 is input to the drive 33 for correction optical system, which thus corrects the irregularity of the pursuit of the main object which is the output of the high-pass filter means 41 to thereby stabilize the image field.

Therefore, even if photographing is effected at a low shutter speed which can fully make the most of the effect of pan shot, the main object will not be blurred.

On the other hand, when the pan shot discrimination signal $S_6$ is not input to the OR-switch portion 43, the singal $S_2$ becomes the signal $S_{12}$ and is input to the drive 33 for correction optical system, which thus effects the correction of ordinary camera shake.

The operation for Y direction is entirely similar to the operation for X direction and therefore need not be described.

The above-described operation is started when the shutter button is half-depressed to make the camera ready for photographing, and is effected from after the shutter button is fully depressed to release the shutter until the shutter is closed.

Accordingly, even when the photographer suddenly stops pan shot or suddenly begins pan shot, pan shot free of blur can be effected on a stationary image field or a main object free of blur without any pre-operation being required.

As described above, in the second embodiment, the drive for correction optical system corrects the irregularity of pursuit occurring when during pan shot, the photographer pursues after the main object and therefore, even if a lower shutter speed is used, the main object will not be blurred.

Description will now be made of a device according to a third embodiment of the present invention. This device has sensors for detecting angular velocities of rotation about a first axis substantially parallel to the image field and a second axis also substantially parallel to the image field and substantially perpendicular to the first axis, and is designed to detect the flow speed of the background on the image field of a camera from the focal length of a photo-taking lens. It is also designed that when the flow speed such is higher than a predetermined level, the pan shot discriminating means of the camera discriminates that the mode is pan shot.

When it is discriminated that the mode is pan shot, shutter speed for pan shot setting means for setting a shutter speed is designed to be operated so that from the flow speed of the background on the image field, the flow amount of the background on the image field may become a predetermined value. Thus, design is made such that when pan shot is effected, the camera sets the then shutter speed from the flow speed of the background so that the pan shot effect may be automatically achieved.

Figure 6:
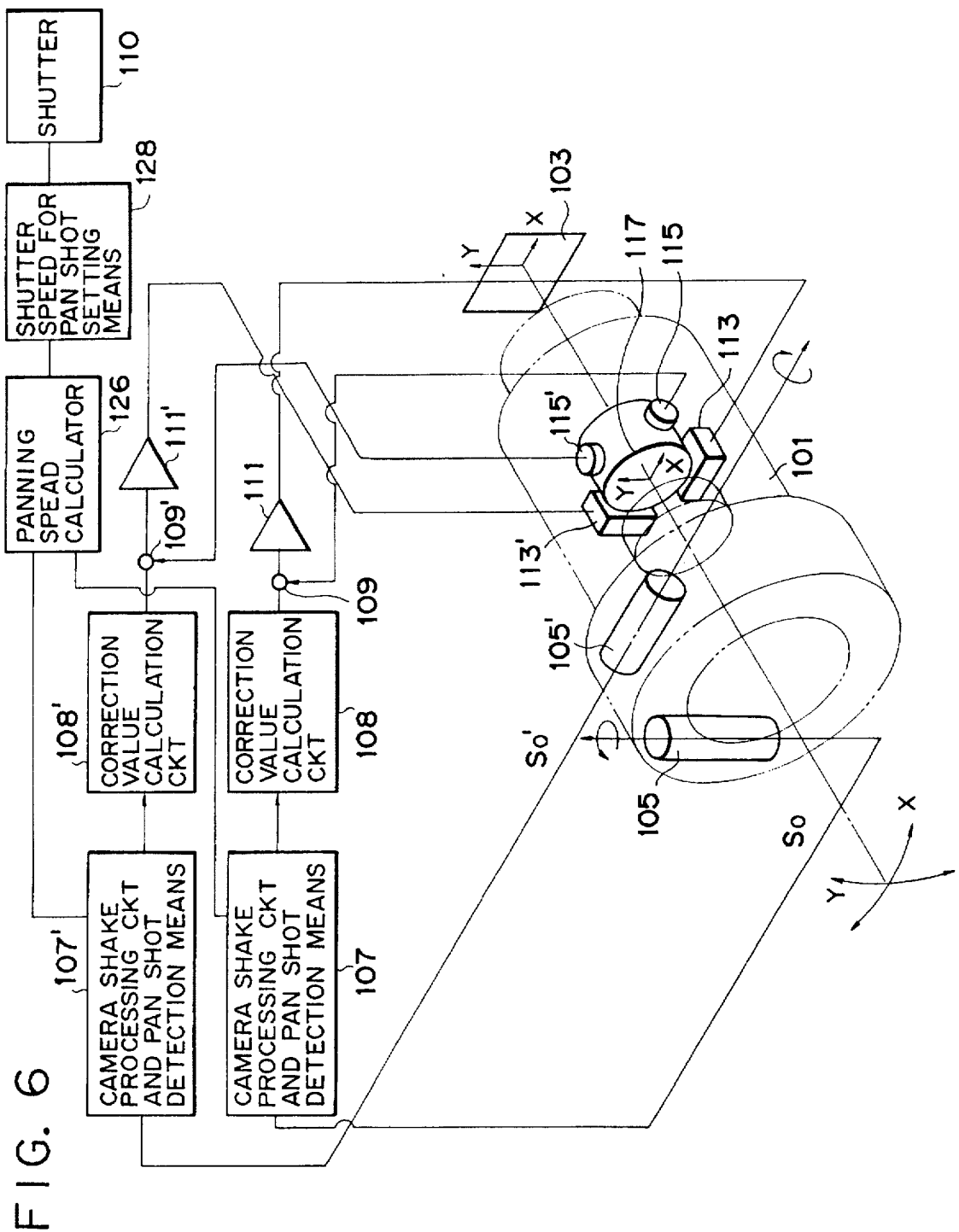
FIG. 6 schematically shows the construction of a pan shot device according to a third embodiment of the present invention.

Referring to FIG. 6 which shows a basic construction for realizing such function, the reference numeral 101 designates a lens barrel, the reference numeral 103 denotes an image field, and the reference numeral 105 designates a sensor for measuring the rotation about the Y-axis parallel to the shorter sides of the image field of the camera and detecting the shake of the image field in X direciton. The reference numeral 105' denotes a sensor for measuring the rotation about the X-axis parallel to the lengthwise direction of the image field of the camera and detecting the shake of the image field in Y direction.

Hereinafter, blocks designated by reference numerals without a prime are blocks for the camera shake detection correction for X direction or blocks common to X direction and Y direction. Reference numerals with a prime designate blocks concerned in the camera shake detection correction for Y direction. Unless particularly described, only those parts concerned with the camera shake in X direction will be described and those parts of the same functions concerned with the camera shake in Y direction need not be described.

In the present embodiment, angular velocity sensors are used as the sensors 105 and 105' for detecting camera shakes in X direction and Y direction, respectively. The reference numeral 107 designates a camera shake processing circuit and pan shot detection means. Panning speed calculating means 126 receives the value processed by the camera shake processing circuit and pan shot detection means 107 and calculates the pursuit speed of pan shot of the camera combined for X direction and Y direction.

The pursuit speed data of pan shot calculated by the panning speed calculating means 126 is supplied to shutter speed for pan shot setting means 128, by which a shutter speed optimum for photographing conditions can be set, and a shutter 110 is driven at that shutter speed, whereby exposure onto the image field is effected.

The foregoing description regards the setting of the shutter speed during pan shot, but in the present embodiment, it is necessary that the prevention of a camera shake and the shutter speed when a stationary object is to be photographed be also taken into consideration and therefore, construction becomes more complicated.

The rotation of the camera detected by the camera shake processing circuit and pan shot detection means 107 is supplied to a correction value calculation circuit 108, which thus produces a correction signal for effecting camera shake correction which will be described later. This correction signal is merged with a feedback control signal from a detector which will be described later at a meeting point 109, and is supplied to actuators 113, 113' through driving circuits 111, 111'. Thereby a camera shake correction circuit 117 is made eccentric in X direction and Y direction. The result is taken out of a detector 115 and is fed back as a feedback signal to the meeting point 109.

The correction value calculation circuit 108, the driving circuit 111 for eccentricity in X direction, the actuator 113, the detector 115 and the camera shake correction optical system 117 are generically named X direction correction optical system driving means 133.

Likewise, for Y direction, the correction value calculation circuit 108', the drivng circuit 111', the actuator 113', the detector 115' and the camera shake correction optical system 117 are generically named Y direction correction optical system driving means 133'.

FIG. 7 is a flow chart schematically showing the operation of this device, and FIG. 8 is a flow chart showing the details of the operation.

At the step 150 of FIG. 7, angular velocity detection is effected and an angular velocity signal $S_0$ is obtained, but since offset is applied to the angular velocity sensor 105, an offset correction process shown at a step 151 is carried out, whereby the angular velocity signal $S_0$ is converted into a vibration waveform signal $S_{101}$ centering around zero. When positive offset is applied, the offset correction process 151 carries out a subtraction process, and when negative offset is applied, the offset correction process 151 carries out an addition process.

Usually, the vibration of a camera shake is of a complicated shape in which waveforms of the order of 10 Hz to the order of 1 Hz are superposed one upon another. Herein, however, for simplicity, description will be put forward with the vibration of a camera shake as a sine wave. Hitherto, the process for X direction and the process for Y direction are entirely similar to each other.

Figure 8A:
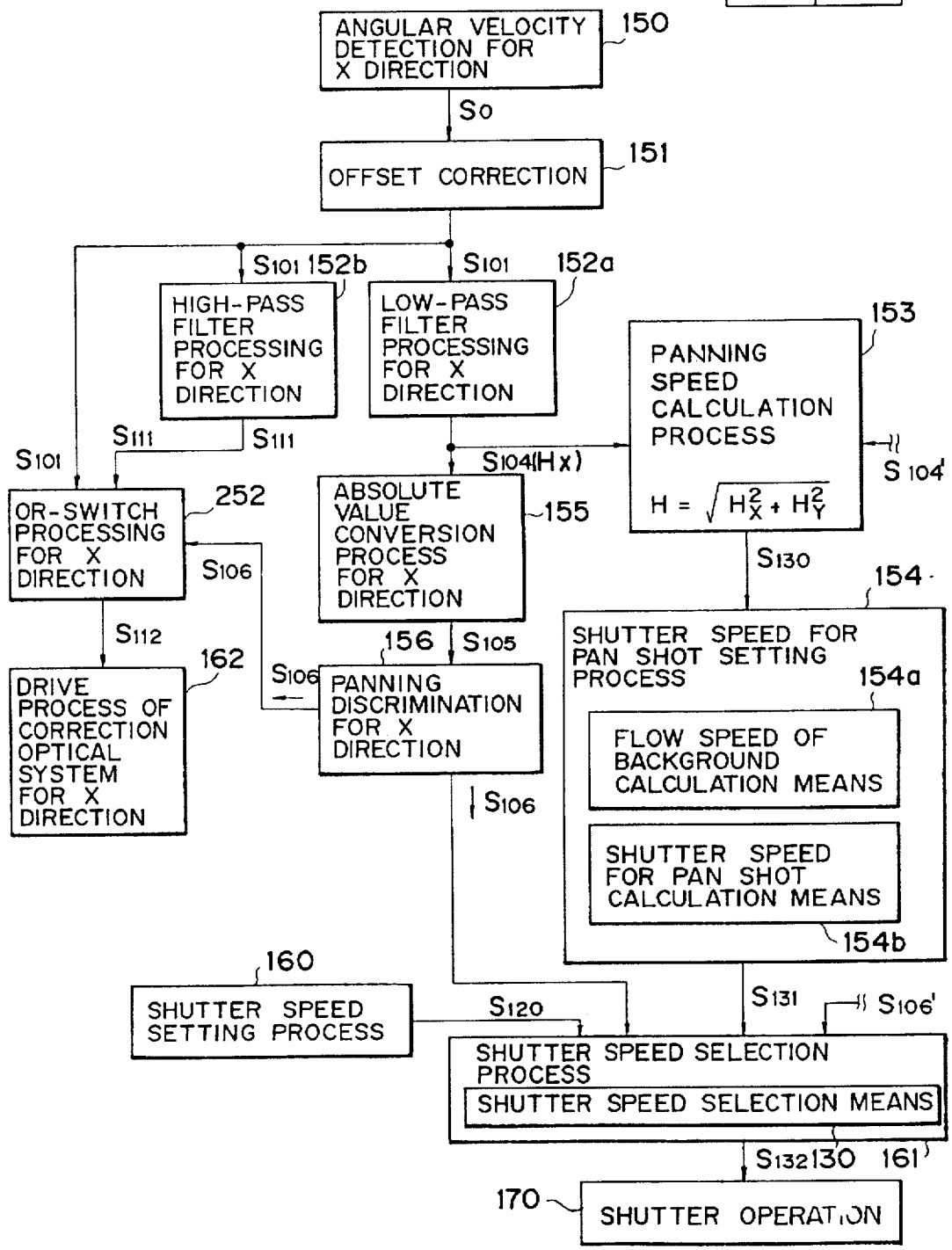
FIGS. 8A and 8B are flow charts illustrating the operation of processing the data of the third embodiment of the present invention.
Figure 9A:
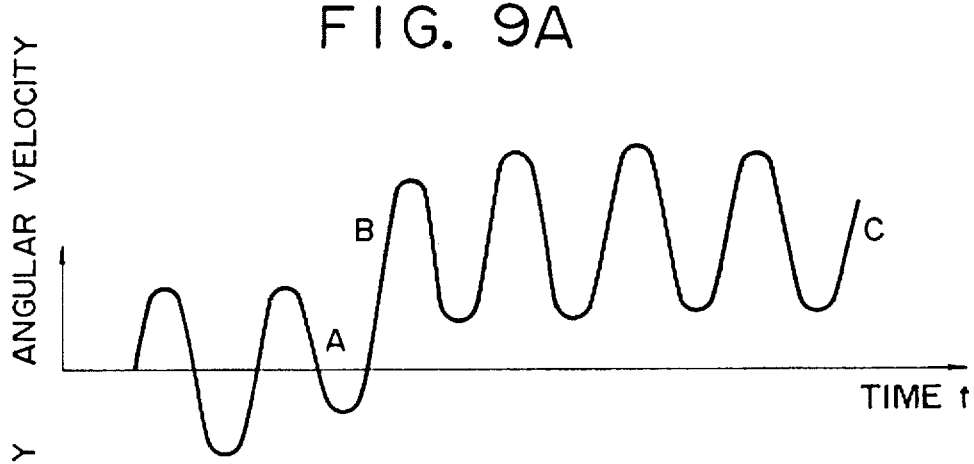
FIGS. 9A-9C are waveform graphs for illustrating the operation of the pan shot device according to the third embodiment.

FIG. 9A shows the vibration waveform signal $S_{101}$ after the offset correction process at the step 151. The signal $S_{101}$ is subjected to filter processing shown at a step 152, and this processing is effected by two processes, namely, low pass filter processing 152a for X direction and high-pass filter processing 152b for X direction as shown in FIG. 8A.

Figure 8B:
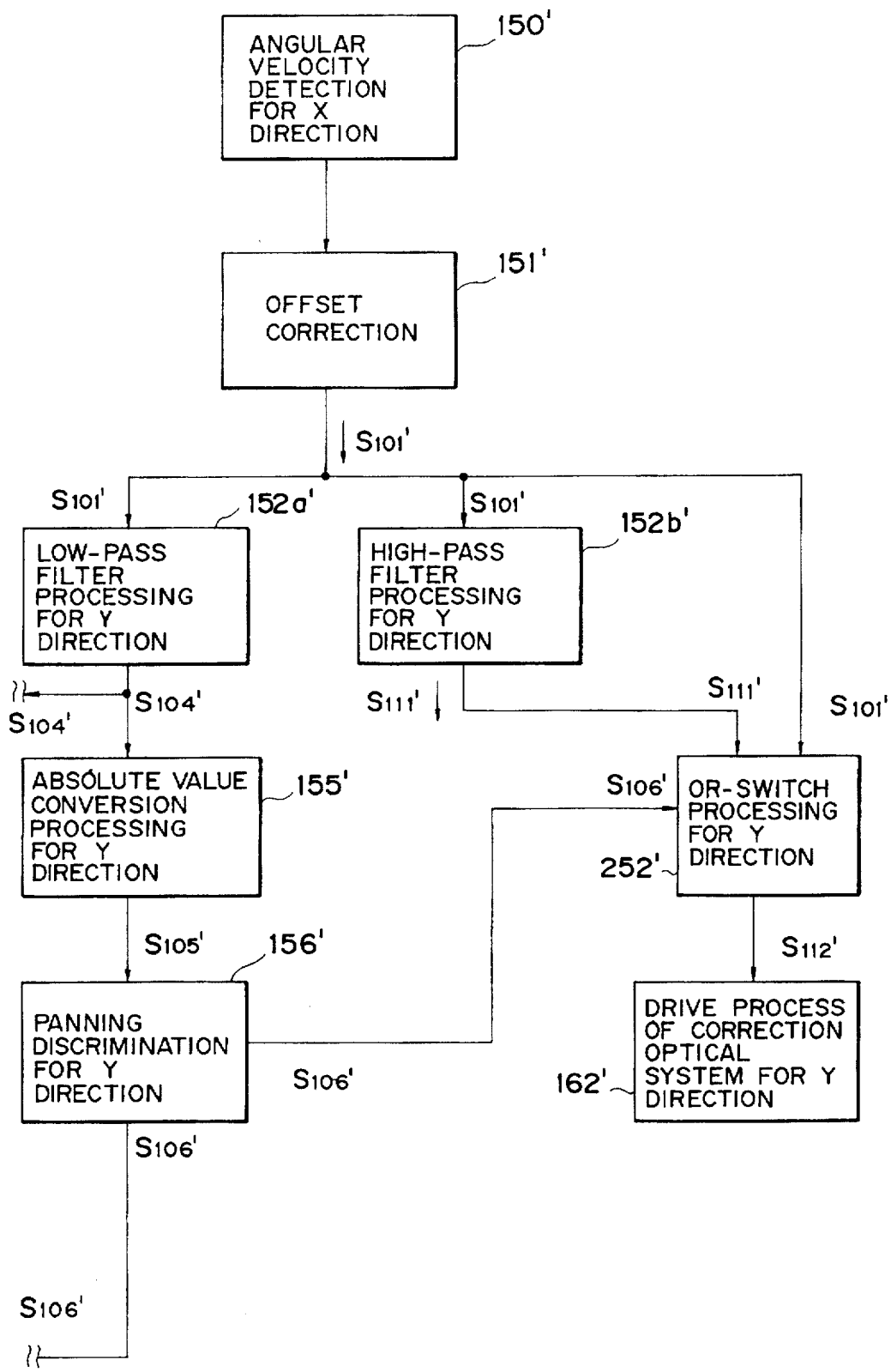

This also holds true of Y direction, as shown in FIG. 8B. That is, the output of offset correction process 51' becomes a signal $S_{101'}$ as shown in FIG. 9A, and this signal $S_{101'}$ is processed by low-pass filter processing 152a' for Y direction, and high-pass filter processing 152b' for Y direction.

Description will now be made of a case where the photographer pans an automobile ascending a steep slope. In such a case, if the photographer levels his camera horizontally, he will have to pan by shaking the camera in both of X direction which is a horizontal direction and Y direction which is a vertical direction. So, the camera catches the automobile at a point A for both of X direction and Y direction in the waveform of the angular velocity of the camera shake shown in FIG. 9A, and pursues after the automobile at a point B and enters pan shot.

In this case, as in the above-described second embodiment, design is made such that when the camera is panning, the low frequency component of the camera shake detection signal is intercepted and camera shake correction is effected not by the low frequency component, but by only a high frequency component. This is for preventing the main object from being blurred by the irregularity of the pursuit during pan shot.

Figure 9B:
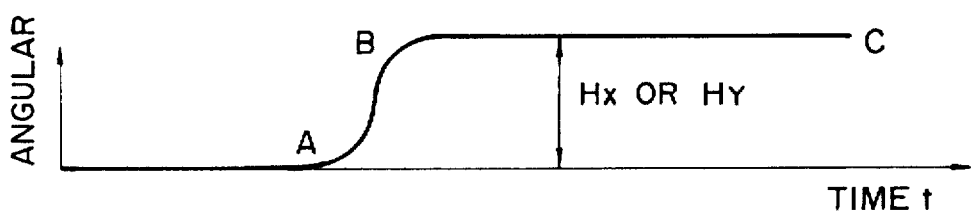

The camera is pursuing after the automobile and therefore, after the point B, it rises from the zero axis in both of X direction and Y direction and is moving at a substantially constant angular velocity. At a point C, the shutter is closed and the pan shot is terminated. A signal $S_{104}$ subjected to low-pass filter processing for X direction has its high frequency component cut and assumes a rising waveform as shown in FIG. 9B. This signal is an angular velocity about the Y-axis, and the height thereof is expressed as Hx.

FIG. 9B shows only a point of time at which the shutter button is half-depressed to make the camera ready for photographing, a point of time A at which the camera catches the automobile, a point of time B at which the camera beings to pursue after the automobile, and a point of time C at which the shutter button is released to terminate exposure onto the image field, and in this figure, a high frequency vibration component is cut.

Likewise, for Y direction, a signal $S_{104'}$ subjected to low-pass filter processing 52a' for Y direction has its high frequency component cut and becomes a signal similar to that for X direction as shown in FIG. 9B. This signal is an angular velocity about the X-axis, and the value thereof is expressed as Hy.

The heights Hx and Hy of the rise in FIG. 9B correspond to the angular velocity at which the camera is shaken. The rise Hx in X direction and the rise Hy in Y direction differ greatly depending on the angle of the slope the automobile ascends, but they are identical as the shapes of signals and therefore are shown in one figure like FIG. 9B.

As shown in FIG. 7, when the filter processing is terminated at the step 152, the panning angular velocity calculation process shown at a step 153 is carried out. The angular velocity is found by the calculation of the following equation (1) on the basis of the signal $S_{104}$ (Hx) after the low-pass filter processing for X direction at the step 152a of FIG. 8A and the signal $S_{104'}$ (Hy) after the low-pass filter processing for Y direction at the step 152a' of FIG. 8B.

$$H=(Hx^2+Hy^2)^{1/2}, \quad (1)$$

where Hx and Hy are rad/sec. unit, and H is the absolute value of the panning angular velocity.

If the angular velocity H during pan shot calculated in this manner is multiplied by the focal length of the photo-taking lens, the rough flow speed of the background on the image field can be known. The panning angular velocity H is the output signal $S_{130}$ after the panning angular velocity calculation process shown at the step 153.

Subsequently, as shown at the step 154 of FIG. 7, a shutter speed for pan shot is set by the shutter speed for pan shot setting means. Here, a shutter speed at which a good pan shot effect can be achieved in the present condition is set in accordance with various conditions such as the focal length and aperture value of the photo-taking lens, film speed and latitude, and the value brought about by the angular velocity $S_{130}$ during pan shot.

The basic concept of the shutter speed for pan shot setting is as follows. The shutter speed during pan shot is usually 1/30 sec. to 1/250 sec. In the pan shot, the product of the angular velocity at which the camera is shaken and the focal length of the photo-taking lens becomes the flow speed V of the background on the image field, and this flow speed V multiplied by a shutter time becomes the flow amount of the background.

So, to achieve always a constant pan shot effect for the main object, the value of the flow speed V of the background on the surface of film multiplied by a shutter time can be made constant. In other words, if the flow amount L of a desired background is divided by the flow speed V of the background on the surface of film, a necessary shutter time T will be obtained. That is, T=L/V.

So, the shutter speed for pan shot setting means 154 of the present invention comprises at least two constituents, i.e., background flow speed calculation processing means 154a for multiplying the focal length of the photo-taking lens by the angular velocity of the camera to thereby calculate the flow speed V of the background on the surface of film, and a pan shot shutter speed calculating process 154b for calculating the necessary shutter time T from an adequate flow amount of the background and the flow speed V of the background on the surface of film.

The relation between the flow speed V of the background on the surface of film and the shutter speed can be schematized as shown in FIG. 10. In FIG. 10, any object moving at a speed lower than a speed V0 is regarded as a stationary object and the camera is operated at a known usual shutter speed.

When the flow speed V of the background on the surface of film becomes higher, the shutter speed becomes higher. For example, the graph is such that if the flow speed V of the background on the surface of film becomes double, the shutter speed becomes higher by one step (shutter time becomes ½). That is, the flow speed of the background to the main object is made constant. Design is also made such that even if the shutter speed is a flow speed of the background higher than V1, the shutter speed is kept at 1/250 sec. and the flow of the background is more emphasized.

In the relation between the flow speed V of the background on the surface of film and the shutter speed as shown in FIG. 10, a definite pan shot effect is always obtained when the flow speed of the background is between V0 and V1. Also, the shutter speed for pan shot setting means of the present invention is designed to be set to a shutter speed most approximate to said shutter speed calculated within the range of the latitude of the film when the calculated shutter speed cannot be attained even by the opening and closing of the stop. However, this is merely an example, and of course, the setting of the shutter speed used may be changed.

The device of the present invention has focal length signal transmitting means for transmitting the focal length of the photo-taking lens from the photo-taking lens to the camera body. Also, in a fixed focus camera which is not of the lens interchange type, the flow speed of the background is uniformly determined simply by the angular velocity of the camera being detected and therefore, the shutter speed for pan shot setting means in this case can be programmed so that the shutter speed may be determined if the angular velocity of the camera is determined.

Subsequently, an absolute value conversion process shown at the step 155 of FIG. 7 is carried out, and in an absolute value conversion process for X direction shown at the step 155 of FIG. 8A, only the absolute value of the input signal $S_{104}$ is output as a signal $S_{105}$ irrespective of the positive or negative sign of the substance Hx of the signal.

This is for detecting only the absolute value of the angular velocity at which the camera is shaken, irrespective of the direction of pan shot, namely, the direction from left to right or the direction from right to left. That is, by the absolute value conversion means for X direction at the step 155, the angular velocity of pan shot can be detected in accordance with the rising signal Hx as shown in FIG. 9B, irrespective of the direction in which the camera is shaken.

Subsequently, as shown at the step 156 of FIG. 7, a panning in X direction discrimination process is carried out. Here, as shown in FIG. 8A, the flow speed of the background on the image field is found from the product of the height of the angular velocity Hx of the camera of FIG. 9B obtained on the basis of the output signal $S_{105}$ of the absolute value conversion process for X direction at the step 155 and the focal length of the photo-taking lens, and whether the photographer is performing pan shot in X direction is discriminated.

For example, design can be made such that it the flow of the background is of the order of 0.05 mm per second, it is judged that the mode is not pan shot in X direction, and if the flow of the background is of the order of 0.5 mm per second, it is judged that the mode is pan shot in X direction. If the panning in X direction discrimination process of the step 156 discriminates that panning in X direction is going on, a signal $S_{106}$ is produced, and if said discrimination process discriminates that panning in X direction is not going on, no signal is produced.

The absolute value converter for X direction at the step 155 may become unnecessary depending on the substance of the panning in X direction discrimination process of the step 156. In this manner, the panning in X direction discrimination is effected by at least the low-pass filter processing for X direction at the step 152a and the panning in X direction discrimination process of the step 156. If it is discriminated that pan shot in X direction is going on, a signal $S_{111}$ passed through the high-pass filter for X direction is processed by the OR-switch for X direction and becomes a signal $S_{112}$ and therefore, the driving means 133 for correction optical system for X direction does not effect the correction of the great angular velocity by pan shot, and the main object is photographed in the image field.

This also entirely holds time of Y direction shown in FIG. 8B. That is, only the absolute value of the output signal 104' of the low-pass filter for Y direction at a step 152a' subjected to the absolute value conversion process for Y direction at a step 155' is output as a signal $S_{105}$' irrespective of the positive or negative sign of the substance of the signal 104'.

This is for detecting only the absolute value of the angular velocity at which the camera is shaken, irrespective of the direction of pan shot, i.e., the direction from below to above or the direction from above to below. That is, by the absolute value conversion process for Y direction at the step 155' being carried out, the angular velocity of pan shot can be detected from the rise Hy as shown in FIG. 9B, irrespective of the direction in which the camera is shaken.

The output signal $S_{105}$' of the absolute value conversion process for Y direction at the step 155' is subjected to a panning discrimination process for Y direction at a step 156'. Here, the flow speed on the image field is found from the product of the height of the rise Hy of the angular velocity of the camera in FIG. 9B and the focal length of the photo-taking lens, and whether the photographer is performing pan shot in Y direction is discriminated.

If the panning discrimination process for Y direction at the step 156' discriminates that pan shot is going on in Y direction, a signal 106' is produced, and if said discrimination process discriminates that pan shot is not going on, no signal is produced. Depending on the construction of the panning discrimination means 156' for Y direction, the absolute value conversion means for Y direction at the step 155' may become unnecessary. In this manner, panning discrimination for Y direction is effected by at least the low-pass filter processing for Y direction at the step 152a' and the panning discrimination process for Y direction at the step 156'. When it is discriminated that pan shot is going on in Y direction, the signal $S_{111}$' subjected to the high-pass filter processing for Y direction is switch-processed for Y direction and becomes a signal $S_{112}$' and therefore, drive means 133' for correction optical system for Y direction does not effect the correction of the great angular velocity by pan shot, and the main object is photographed in the image field.

Also, where the photo-taking lens mounted on the camera is a zoom lens, if the focal length signal at which photographing is being effected is input to the panning discrimination means for X direction and the panning discrimination means for Y direction, whether pan shot is going on can be discriminated by Hx and Hy. This also holds true of the aforedescribed shutter speed for pan shot setting means 154.

As regards the focal length signal, in the case of a zoom lens, for example, a brush is provided on a zoom ring or a member operatively associated therewith and is slidden on a gray code, whereby a CPU on the lens side digitally reads the focal length and an electrical signal is transmitted to the camera body. The focal length of a single-focus lens is digitally written in the software of the CPU on the lens side, and the focal length of the lens is transmitted to the camera side by an electrical signal. Focal length transmitting means is constructed as described above.

In the case of a camera which is not of the lens interchange type and on which a lens of a single focal length is mounted, the flow speed of the background on the image field is determined by only the angular velocity of the camera about the Y-axis or about the x-axis and therefore, the panning discrimination process can effect the discrimination of pan shot by only the angular velocity of the camera. That is, if the angular velocity is of the order of e.g. 0.349 rad (about 20 degrees) per second, it is judged that pan shot is going on. This also holds true of both of the panning discrimination process for X direction at the step 156 and the panning discrimination process 156' for Y direction.

Figure 9C:
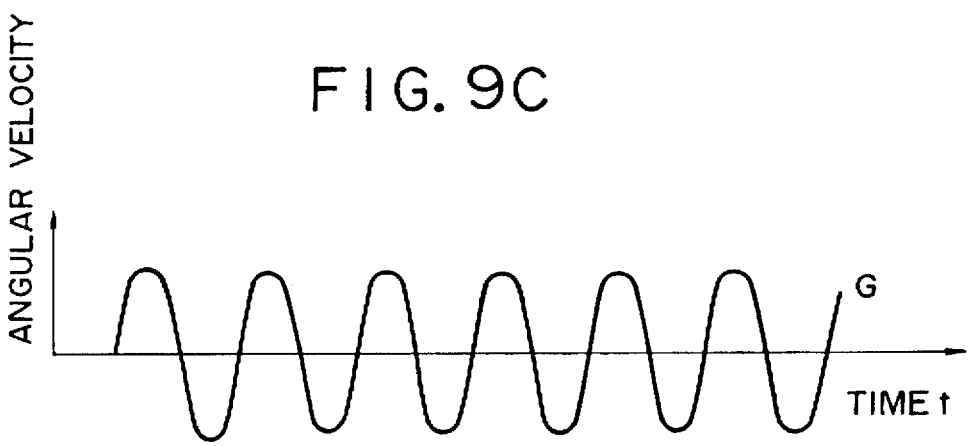

The signal $S_{111}$ subjected to the high-pass filter processing for X direction shown at the step 152b in FIG. 8A has its low frequency component of the angular velocity of the camera shake cut and only the high frequency component thereof is output. FIG. 9C shows this, and in this figure, the rising portion occurring during pan shot is cut and only a high frequency component is left. This high frequency component is the irregularity of the pursuit of the main objected occurring during pan shot.

This irregularity does not appear in the photograph when during pan shot, photographing is being effected at a relatively high shutter speed, yet it appears as the blur of the main object in X direction when a low shutter speed is set to fully achieve the pan shot effect. Therefore, an or-switch process for X direction shown at the step 157 of FIG. 7 is carried out. An or-switch process for X direction shown at a step 158 is for correcting an ordinary camera shake.

The output signal $S_{111}$ of the high-pass filter processing for X direction at the step 152b is subjected to or-switch processing for X direction shown at a step 252, and three signals at the maximum are input to the or-switch processing of the step 252. They are the output signal $S_{101}$ of the offset correction process from the step 151, the output signal $S_{111}$ of the high-pass filter processing for X direction at the step 152b and the output signal $S_{106}$ of the panning discrimination process for X direction at the step 156.

The or-switch processing for X direction at the step 252 receives only the output signal $S_{111}$ of the high-pass filter processing for X direction at the step 152b during pan shot in which the output signal $S_{106}$ of the panning discrimination process for X direction at the step 156 is produced, and puts out that signal as a signal $S_{112}$. This is for correcting the irregularity of the pursuit of the main object during pan shot. However, during ordinary photographing in which the output signal $S_{106}$ of the panning discrimination process for X direction at the step 156 is not produced, namely, when pan shot is not effected, the signal $S_{101}$ after the offset correction effected at the step 151 is output as a signal $S_{112}$ by the or-switch processing for X direction at the step 252. This is for correcting an ordinary camera shake.

The foregoing is the description of the processing for X direction, and substantially similar processing is effected for Y direction. That is, at the step 156' of FIG. 7, panning discrimination for Y direction is effected, and depending on the result thereof, or-switch processing for Y direction at a step 157' or a step 158' is effected.

When the or-switch processing Y direction at the step 158', i.e., the process of outputting the offset correction output signal $S_{101'}$ of the step 151' as a signal $S_{112'}$, is being carried out, the correction of the camera shake of the stationary object is effected with respect to Y direction. At a step 159, X direction panning discrimination is effected again. That is, at the step 156, whether pan shot is going in X direction is confirmed again.

If at the step 159, pan shot for X direction is not going on, it means that pan shot is not going on in either of X direction and Y direction and therefore, at the step 160 of FIG. 7, shutter speed setting is effected to thereby output a shutter signal $S_{120}$. However, when the X direction paning discrimination at the step 159 is effected, pan shot is going on in X direction and therefore, a shutter speed selecting process at a step 161 is carried out.

The shutter speed setting means shown at the step 160 is used when a stationary object is photographed, and the shutter speed is set by a conventional method in accordance with information such as the aperture value of the phototaking lens, the brightness of the object, film speed and latitude. The output signal $S_{120}$ of the shutter speed setting process of the step 160 is subjected to the shutter speed selecting process shown at the step 161 in FIG. 7.

Thus, total four signals at the maximum have been input in the shutter speed selecting process of the step 161. They are the output signal $S_{131}$ of the shutter speed for pan shot setting process of the step 154, the output signal $S_{120}$ of the shutter speed setting process of the step 160, the output signal $S_{106}$ of the X direction panning discrimination process of the step 156, and the output signal $S_{106'}$ of the Y direction panning discrimination process of the step 156'.

Depending on whether the camera is in its pan shot condition, the shutter speed selecting process shown at the step 161 is designed to make the output signal $S_{131}$ of the shutter speed for pan shot setting process of the step 154 into the output signal $S_{132}$ of the shutter speed selecting process of the step 161, or make the output signal $S_{120}$ of the shutter speed setting process of the step 160 into the output signal $S_{132}$.

Specifically, if both or at least one of the output signal $S_{106}$ of the X direction panning discrimination process of the step 156 and the output signal $S_{106'}$ of the Y direction panning discrimination process of the step 156' is input to the shutter speed selecting means 130, it is judged that the camera is in its pan shot condition, and the output signal 131 of the shutter speed for pan shot setting process is intactly put out as the output signal 132.

On the other hand, at this stage, the correction optical system starts to be driven as shown at the step 162 of FIG. 7, and when pan shot is being effected here, the signal $S_{106}$ is input to the step 152 of FIG. 8A, and the step 152 intactly receives the signal $S_{111}$ subjected to the high-pass filter processing for X direction at the step 152b and puts out it as a signal $S_{112}$. At this time, at the step 162, the signal $S_{112}$ is subjected to the driving process for correction optical system for X direction and is input to the drive means 133 for correction optical system for X direction, which thus corrects the blur caused by the irregularity of the pursuit during pan shot.

This also holds true of Y direction. That is, when pan shot is being effected, a signal $S_{106'}$ is input to the step 152' of FIG. 8B, and the step 152' intactly receives a signal $S_{111'}$ subjected to the high-pass filter processing for Y direction at a step 152b' and puts out it as an output signal $S_{112'}$. At this time, at a step 162', the signal $S_{112'}$ is subjected to a driving process for correction optical system for Y direction and is input to drive means 133' for correction optical system for Y direction, which thus corrects the blur caused by the irregularity of the pursuit during pan shot.

This exposure is such that during pan shot, the opening-closing of the shutter 110 of the image field is effected at the shutter time of the output signal $S_{131}$ of the shutter speed for pan shot setting process shown at the step 154. Also, if neither of the signal $S_{106}$ and the signal $S_{106'}$ is input to the shutter speed selecting process of the step 161, it is judged that the camera is not effecting pan shot, and the shutter speed selecting process of the step 161 selects the output singal $S_{120}$ of the shutter speed setting process shown at the step 160, and transmits it as the output $S_{132}$ thereof to the shutter 110. The shutter 110 then effects the opening-closing of the image field at the shutter time of the output signal $S_{120}$ of the shutter speed setting process of the step 160 used when a stationary object is photographed.

When pan shot is not being effected, the signal $S_{106}$ is not input to the step 252 of FIG. 8A and therefore, the step 252 receives the signal $S_{101}$ offset-corrected at the step 151 and puts out it intactly as an output signal $S_{112}$. At this time, at a step 162, the signal 112 is subjected to the driving process for correction optical system for X direction and is input to the drive means 133 for correction optical system for X direction, which thus effects the correction of the ordinary camera shake in X direction. The operation is entirely similar for Y direction and need not be described.

As described above, design is made such that the shutter speed selecting means selects an optimum shutter time in accordance with whether pan shot is going on or not.

In the present device, during pan shot, the camera automatically assumes its pan shot condition. At this time, a low-pass filter is inserted into the transmission system for the camera shake detection signal to thereby detect the angular velocity of pan shot, and the shutter speed during pan shot is automatically determined from the value of this angular velocity and the focal length of the lens.

Also, design is made such that during ordinary photographing which is not pan shot, the camera automatically gets out of its pan shot condition and the shutter speed is determined by a conventional method while a camera shake is prevented by the shake preventing function. Accordingly, in this camera, the shutter speed can be automatically determined in any case.

As described above, the shutter speed for pan shot setting means is operated by the flow speed of the background on the surface of film and therefore, the shutter speed during pan shot for which the photographer's experience and intuition have heretofore been resorted to can be automatically determined by making the most of the pan shot effect.

Also, pan shot discriminators are provided for both of X direction and Y direction and therefore, even when the photographer suddenly stops or beings pan shot for any object moving obliquely relative to the image field, a still image field free of blur or pan shot free of blur in a main object can be accomplished without any pre-operation being required.

What is claimed is:

1. A camera, comprising:
    a camera shake detecting device detecting a camera shake and outputting a camera shake signal indicative of the camera shake;
    a correction optical system correcting the camera shake;
    a correction optical system driving device driving the correction optical system solely on the basis of the camera shake signal from the camera shake detecting device;

a pan shot discriminating device eliminating a high frequency component of the camera shake signal from the camera shake detecting device and discriminating whether the camera is in a pan shot condition on the basis of the camera shake signal from which the high frequency component has been eliminated;

a camera shake component extracting device eliminating a low frequency component of the camera shake signal from the camera shake detecting device to thereby extract a camera shake component; and a switching device inputting to the correction optical system a camera shake component in a pan shot direction extracted by the camera shake component extracting device when the pan shot discriminating device determines that the camera is in the pan shot condition.

2. A pan shot device for a camera, comprising:

an angular velocity detecting device detecting an angular velocity of a camera body about an axis parallel to a photographing image field of the camera and producing a signal indicative of the angular velocity; and a shutter speed setting device setting a shutter speed suitable for a pan shot solely on the basis of the signal from the angular velocity detecting device.

3. A pan shot device according to claim 2, wherein the angular velocity detecting device detects a first angular velocity about a first axis that is substantially parallel to a first side of the photographing image field of the camera and a second angular velocity about a second axis that is substantially parallel to a second side perpendicular to the first side of the photographing image field.

4. A camera, comprising:

an angular velocity detecting device detecting an angular velocity of a camera body of the camera about an axis parallel to a photographing image field of the camera and producing a signal indicative of the angular velocity;

a background flow speed calculating device calculating a background flow speed on the photographing image field on the basis of the signal from the angular velocity detecting device and the focal length of a lens mounted on the camera body of the camera;

a pan shot discriminating device discriminating solely on the basis of the background flow speed whether the camera is in a pan shot condition; and a shutter speed setting device setting a shutter speed to a value suitable for a pan shot on the basis of the background flow speed.

5. A camera according to claim 4, wherein the angular velocity detecting device detects a first angular velocity about a first axis substantially parallel to a first side of the photographing image field of the camera and a second angular velocity about a second axis substantially parallel to a second side perpendicular to the first side of the photographing image field.

6. A camera according to claim 4, further comprising:

a shutter speed selecting device operating a shutter at a shutter speed set by the shutter speed corresponding to the output of the pan shot setting device when the pan shot discriminating device determines that the camera is in the pan shot condition.

7. A pan shot device for a still camera, comprising:

an angular velocity detector to detect an angular velocity of a still camera body; and a pan shot discriminating device discriminating solely on the basis of the angular velocity detected by the angular velocity detector whether the still camera is in a pan shot condition, wherein the angular velocity detector outputs a signal in proportion to the angular velocity of the camera body about a predetermined axis, and the pan shot discriminating device discriminates whether the camera is in the pan shot condition on the basis of the signal from which a high frequency component of the signal has been eliminated.

8. A camera, comprising:

a camera shake detecting device detecting a camera shake and outputting a camera shake signal indicative of the camera shake;

a correction optical system correcting the camera shake;

a pan shot discriminating device discriminating solely on the basis of the camera shake signal from the camera shake detecting device whether the camera is in a pan shot condition; and a control device controlling a driving state of the correction optical system on the basis of the camera shake signal and a result of a discrimination by the pan shot discriminating device, wherein the pan shot discriminating device includes means for eliminating a high frequency component of the camera shake signal and for discriminating on the basis of the camera shake signal from which the high frequency component has been eliminated whether the camera is in the pan shot condition.

9. A camera according to claim 8, further comprising:

a switching device turning the correction optical system off when the pan shot discriminating device determines that the camera is in the pan shot condition so that the inputting of the camera shake signal to the control device in a pan shot direction is not affected, thereby suspending camera shake correction in the pan shot direction.

10. A pan shot device for a camera, comprising:

an angular velocity detector detecting an angular velocity of a camera body; and a pan shot discriminating device discriminating solely on the basis of the angular velocity detected by the angular velocity detector whether the camera is in a pan shot condition, wherein the angular velocity detector outputs a signal in proportion to the angular velocity of the camera body about a predetermined axis, and the pan shot discriminating device discriminates whether the camera is in the pan shot condition on the basis of the signal from which a high frequency component of the signal has been eliminated.

11. A pan shot device according to claim 10, wherein the angular velocity detector detects a first angular velocity about a first axis that is substantially parallel to a first side of a photographing image field of the camera and about a second axis that is substantially parallel to a second side perpendicular to the first side of the photographing image field.

* * * * *